May 25, 1971      J. L. HOLLIS ET AL      3,580,781
APPARATUS FOR BUILDING UP TREAD MATERIAL ON A TIRE CARCASS
Original Filed Oct. 15, 1963      4 Sheets-Sheet 1
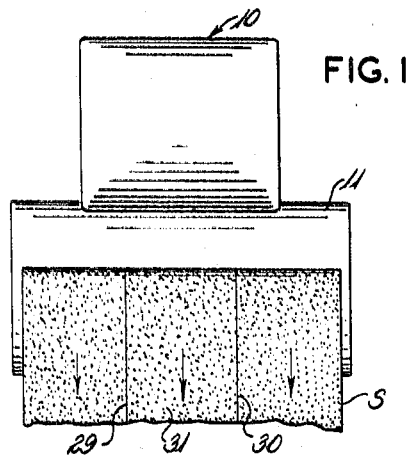
FIG. 1
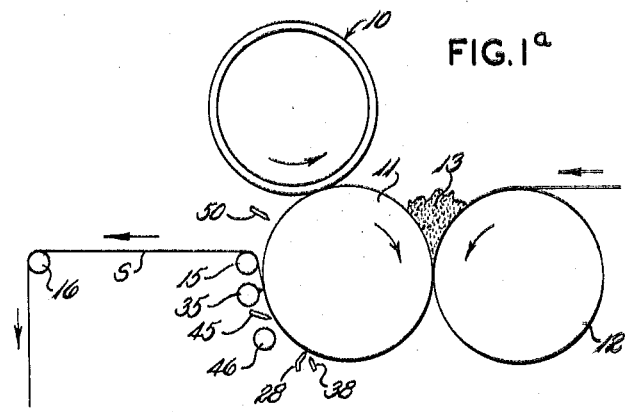
FIG. 1ª
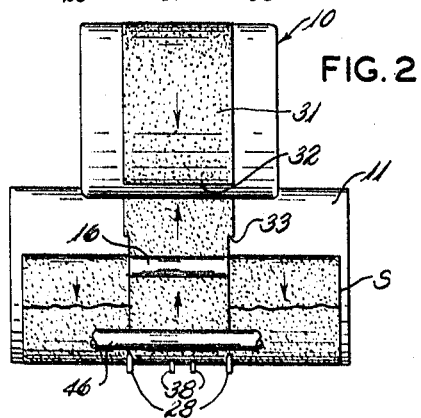
FIG. 2
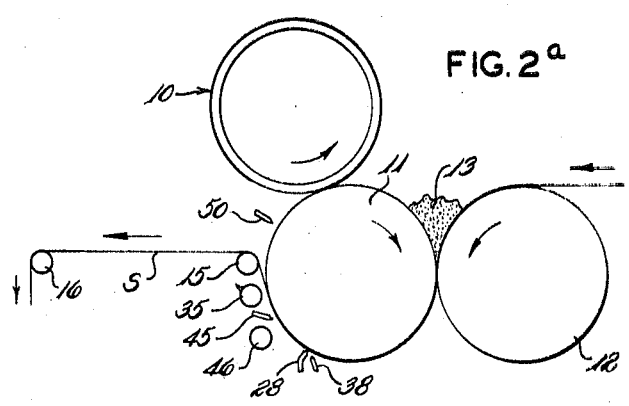
FIG. 2ª
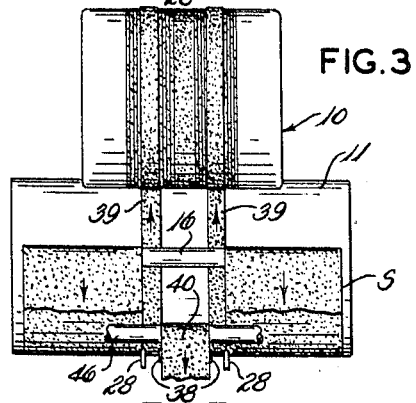
FIG. 3
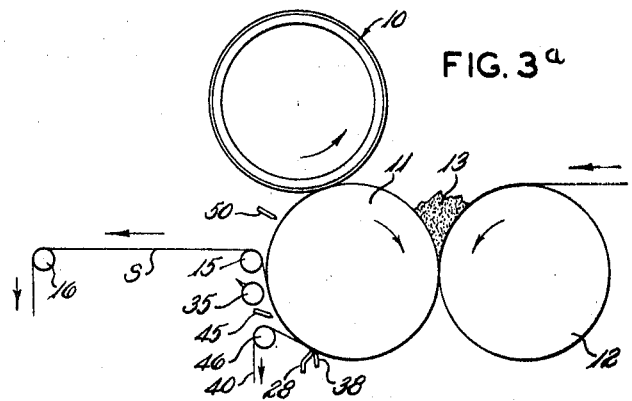
FIG. 3ª
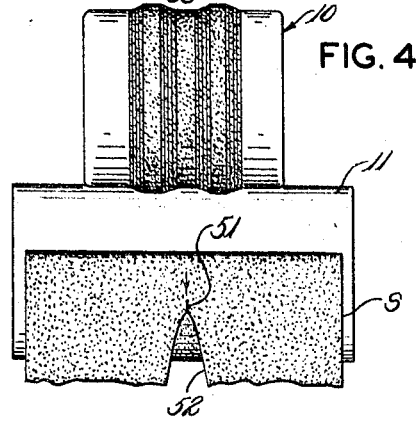
FIG. 4
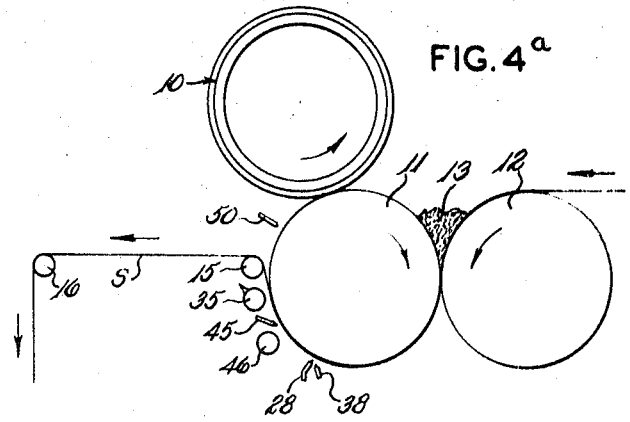
FIG. 4ª

May 25, 1971  J. L. HOLLIS ET AL  3,580,781

APPARATUS FOR BUILDING UP TREAD MATERIAL ON A TIRE CARCASS

Original Filed Oct. 15, 1963  4 Sheets-Sheet 2

FIG. 5

3,580,781
APPARATUS FOR BUILDING UP TREAD MATERIAL ON A TIRE CARCASS

Jack Lyndon Hollis, Pottstown, Pa., and Ray Douglas Shockey, Uniontown, Ohio, assignors to The Firestone Tire & Rubber Company, Akron, Ohio
Continuation of abandoned application Ser. No. 316,287, Oct. 15, 1963. This application May 20, 1968, Ser. No. 740,795
Int. Cl. B29h 17/20
U.S. Cl. 156—397                4 Claims

ABSTRACT OF THE DISCLOSURE

A tire carcass supported in rotating contact with a roll picks up rubber tread material from the roll to build up the desired contour of tread material on the carcass. Cutters on the roll separate a sheet of tread material into a plurality of ribbons, at least one of which is removed from the roll before the roll contacts the tire carcass. The cutters are positioned to vary their spacing and thus change the ribbon widths. By removing the center strip, tread material in the shoulder areas can be built up as desired.

---

This application is a continuation of our copending application Ser. No. 316,287, filed Oct. 15, 1963, now abandoned.

This invention relates generally to the art of applying unvulcanized rubber material to pneumatic vehicle tire carcasses such as, for example, is required in the manufacture of new tires. More specifically, it relates to the application of rubber material for a tire tread or the tread and side wall portions in the proper quantity and position on a tire carcass and contemplates a method and apparatus capable of performing this method such that the rubber material is applied to successive tire carcasses from a continuously calendered sheet of the rubber material. As used herein, the term tire carcass is contemplated as encompassing the conventional built up new tire carcass band comprising the usual plies of rubber and rubberized cord with beads at the edges of the carcass band as well as used tire carcasses prepared to be retreaded.

For many years the conventional technique for forming the tread and side wall portions on new tires has involved utilizing an extruded solid strip of rubber material having the appropriate full cross section contour required to form the tread and side walls on the completed tire. Such a strip is cut to the proper length for wrapping around the carcass periphery and when applied to the carcass has the cut ends spliced where they meet on the tire carcass periphery. A not too dissimilar approach is usually undertaken in retreading used tires where a strip of material is wrapped around the used tire carcass and a splice at the ends of the strip formed. In both techniques, the tire carcass with the tread or tread and side wall portions of unvulcanized material is thereafter placed in an appropriate forming mold to vulcanize and mold the rubber material into the tire tread design, etc.

The approach of utilizing an extruded strip of unvulcanized rubber material which is wrapped around the tire carcass and the cut ends joined does present certain problems and disadvantages in the final new tire or in the retreaded tire product. The joint gives rise to a possible weak point as far as the tread rubber becoming disconnected at the joint and stripping from the tire in high speed vehicle operation. Also, the joint presents problems in obtaining a well balanced tire. The length of the cut strip must be precisely equal to the circumference of the tire carcass on which it is applied. If it is too long, an excess amount of rubber will exist at the joint. If it is too short, the rubber material of the strip may have to be extended thus placing a reduced quantity of rubber material at the joint. In either case, the balance of the tire is detrimentally affected.

Aside from the above described techniques for applying unvulcanized rubber material to a tire carcass there have been suggestions in the art for forming the tread or the tread and side walls on the tire by wrapping a continuous ribbon on the periphery of the tire carcass and building up the desired quantity of ribbon for each position on the tread or tread and side walls by controlling the number of wraps and the ribbon wound onto the tire carcass at each position across the width of the carcass. Such a proposal is more fully described in Hanson Reissue Pat. 25,349. This technique has definite advantages in alleviating the joint extending transversely across the tire and thus solves the problem of imbalance of the tire.

There also have been suggestions in the art of applying tread rubber in the form of a calendered sheet. An example of such a technique used in the manufacture of solid rubber tires is disclosed in McClenathen Pat. 1,312,491. An example of applying tread rubber to used pneumatic tire carcasses by winding a calendered sheet onto the carcass is disclosed in Woock Pat. 2,009,599. In both of these patents, the build up of rubber material, on the metal base rim in the case of solid rubber tires or on the toroidal form of the used tire carcass, presents a uniform transverse depth of material across the width of the tire. These proposals fail to provide a satisfactory solution for applying the rubber material to give the required cross sectional contour and positioning of the rubber material on the carcass so that in the final molding operation the material will be properly molded into the tread shoulders, tread design and side walls as required. It may be pointed out that the tread shoulders at the junction between the tread and the side walls require a greater quantity of rubber material than is needed at the center of the tread or at either of the side walls. Thus, the application of a uniform depth layer of rubber across the tire carcas width, such as obtained by the techniques of the Woock and McClenathen patents, is not suitable for molding into the tread designs of present day vehicle tires.

It is a principal object of the instant invention to provide a method and apparatus wherein unvulcanized rubber material can be applied to a tire carcass from a calendered sheet of such material while obtaining proper disposition and build up of the material across the carcass face as is needed to form the tread or tread and side wall portions of the tire.

It is another important object of this invention to provide a method and apparatus whereby the tread or tread and side walls may be built up on a tire carcass from a continuous calendered sheet of unvulcanized rubber material in an essentially automatic continuous operation by winding the sheet directly onto the carcass from the calender roll.

Another object of the invention is to provide method and apparatus wherein proper tread or tread and side wall contour, in depositing the rubber material on the tire carcass, is built up from a continuous calendered sheet with the continuity of the sheet not being interrupted incident to application of the rubber material to each tire carcass and to tire carcasses in succession.

The above and other objects of the instant invention will be more readily apparent by reference to the accompanying drawings in which a preferred embodiment is disclosed by way of example, various modifications and changes in details thereof being contemplated within the scope of the appended claims. One form of the apparatus for carrying out the method of the invention is illustrated on the accompanying drawings in which:

FIGS. 1, 2, 3 and 4 are elevational views diagrammatically showing four successive stages in the application of calendered unvulcanized rubber material to a tire carcass in accordance with the instant invention;

FIGS. 1(a), 2(a), 3(a) and 4(a) are end elevational views corresponding respectively to the diagrammatic representations shown in FIGS. 1, 2, 3 and 4;

FIG. 5 is an end elevation showing certain of the operating elements for manipulating the calendered sheet in applying material to the tire carcass;

To prepare the material for application to the tire carcass, a calendered sheet of material such as unvulcanized rubber suitable for tire use and of a width greater than the maximum width of rubber material to be applied to the tire carcass is produced on a suitable calender. The operation of calenders is well known in the tire industry and the functioning thereof in producing a sheet of unvulcanized rubber material need not be discussed at length herein. A simple two roll calender is shown on the drawings solely for purposes of illustration. By the operation of a calender the rubber material is masticated and worked between the rotating calender rolls to the point where it passes between the bite of the rolls and continues as a sheet adhering to one of the calender rolls. The thickness of the calendered sheet can be varied within limits by adjustment of the spacing between the calender rolls.

As far as the thickness of the calendered sheet is important in the instant invention, this sheet thickness will be selected to be of maximum thickness so that only a minimum number of turns of the tire carcass and layers of material need be applied in building up the tread or tread and side walls, keeping in mind that an unduly thick calendered sheet would preclude obtaining the accuracy needed in precisely depositing the material to obtain the required cross sectional contour for the tread or tread and side walls. Thus, the thickness of the sheet must be kept within reasonable limits to achieve the accuracy of application of the proper quantities of rubber material at the right position on the tire carcass.

Figure 7:
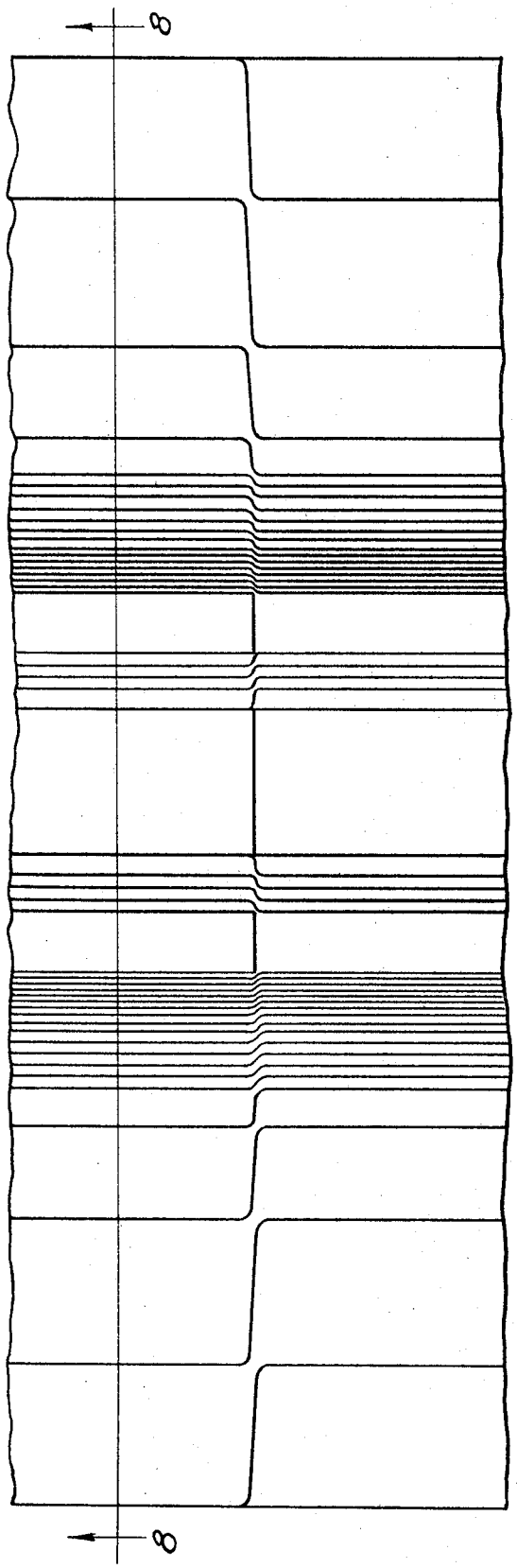
FIG. 7 is an elevational view showing the relationship of layers of rubber material and the manner in which their width is successively diminished each revolution of the tire carcass.
Figure 8:
FIG. 8 is a sectional view taken on lines 8—8 of FIG. 7.

The maximum width required for the calendered sheet will depend upon whether only the tread is to be built up or whether both the tread and side walls are to be applied to the tire carcass in accordance with the instant invention. Referring to FIGS. 7 and 8 wherein the build up of the rubber material layers for both the tread and the side walls is illustrated, the maximum width calendered sheet required will be the full width as shown on these figures such width extending from the outer edge of one side wall across beneath the tread to the opposite edge of the other side wall.

Reference may be made to FIGS. 1, 2, 3 and 4 and their corresponding end views 1(a), 2(a), 3(a) and 4(a) for an understanding of the method of the instant invention in applying rubber material to a tire carcass. These figures on the drawings show four separate stages in build up of unvulcanized rubber material on a tire carcass from a calendered sheet. These figures are somewhat diagrammatic in their showing of the various components to enable more effective illustration of the instant method invention. It will be understood that appropriate supporting frames, bearings, drives, etc. for these components will be provided in any apparatus constructed to carry out the method invention herein. For purposes of illustration the tire carcass is shown in the form of the cylindrical carcass band which in new tire production conventionally is built up on a drum from plies of rubber and rubberized cord with the tire beads enclosed at the opposite ends of the carcass band.

The tire carcass is shown at 10. It is suitably mounted on a drum supported on a shaft to be rotatable as the calendered rubber material is wound onto the carcass. To wind the material on the carcass, the carcass is rotated by the rotating calender roll 11. The two roll calender illustrated is made up of calender rolls 11 and 12. The mass of unvulcanized rubber material worked between these rolls is shown at 13 from which it is formed into a calendered sheet S that passes around beneath roll 11 with the calender rolls 11 and 12 operating in the direction of the arrows shown on FIG. 1(a). It will be appreciated that a three roll calender or other suitable calender construction may be employed in place of the two roll calender diagrammatically illustrated.

In initiating the rubber material applying operation, the calendered sheet of material S is drawn from calender roll 11 across a horizontal roller 15 and a horizontal roller 16 and thence permitted to pass downwardly beneath a roller 17 (FIG. 5) whereupon the material is deposited onto a convyor 20 that carries the sheet beneath the calender to return it to a feed mill 25. The feed mill reworks any of the unused material from the sheet and adds it to the mass of material 13 supported at the bite of calender rolls 11 and 12. In this initial starting up operation the complete calendered sheet passes from calender roll 11 and is returned to the feed mill and thence back to the calender to be reformed into a sheet. Of course, as material is removed from this sheet and applied to a tire carcass as will be explained hereinafter, the feedmill is supplied with additional rubber material which is added to the calender to maintain an appropriate amount of material to be calendered into sheet stock.

The tire carcass 10 is now resting on the upper surface of calender roll 11 and being rotated thereby, but no material is picked up by the carcass since the entire calendered sheet is drawn away from the calender roll 11 across rollers 15 and 16.

The sheet S is then longitudinally slit as it comes beneath calender roll 11 by pressing a pair of spaced slitting knives 28 against the calender roll. These two knives 28 may be referred to as outside knives and are spaced to provide parallel slits 29 and 30 longitudinally of the calendered sheet as shown in FIG. 1 so that a strip 31 is created running longitudinally of the calendered sheet. To initially cut out and remove a leading end of strip 31 from the sheet S, there is provided a rotary knife 35 mounted adjacent the periphery of calender roll 11. Rotation of knife 35 a single revolution, as may be accomplished by suitable drive means with electric clutches and brakes, operates to make a transverse cut across strip 31 to sever the end from the calendered sheet. Thereafter, this strip adheres to calender roll 11 instead of passing across roller 15 with the remainder of the calendered sheet. This end of strip 31 passes up to where the carcass is resting on calender roll 11. The inherent tackiness of the freshly calendered hot strip 31 causes it to adhere firmly to the carcass whereupon it commences to wind onto the carcass as rotation of the calender roll 11 imparts rotation to the carcass 10. Thereafter, the spaced knives 28 are progressively moved closer together in stepped increments for each rotation of the carcass to thereby decrease the width of strip 31 in accordance with the predetermined program for build up of proper material contour on the carcass.

FIGS. 2 and 2(a) illustrate the manner in which strip 31 is initially wound onto the carcass 10, FIG. 2 showing the end 32 cut by rotary knife 35 as the strip 31 is almost completely wound one turn on carcass 10. FIG. 2 also shows at 33 the first stepped decrease in the strip 31 width resulting from knives 28 having been moved together one increment. This winding of the calendered strip 31 onto the carcass 10 continues until the requisite number of layers have been applied to provide the required quantity and positioning of rubber material except for the material for the tread shoulders. Referring to FIGS. 7 and 8, this build up of layers would complete application of rubber material for the side walls, tread base and main tread portion leaving only the tread shoulder rubber to be applied, illustrated on these figures as requiring five more turns of the carcass to wrap on layers of calendered material. Of course as the width of strip 31 is diminished, the quantity of material remaining in calendered sheet S passing over rolls 15 and 16 and there after returned to the feed mill is correspondingly increased.

When the shoulder portions of the tread are to be built up with the material, a pair of spaced inside knives 38 are pressed against the calender roll 11 which, as further length of sheet S is calendered, slits the strip 31 into three continuous ribbons comprising two spaced outer ribbons 39 and a center ribbon 40. At this time, a center cutout knife 45 moves inwardly against the calender roll 11. This knife cuts transversely across the end of center ribbon 40 causing the ribbon to pass away from calender roll 11 across a driven roll 46 rather than continue along adhering to the calender roll. The center ribbon then passes downwardly to be deposited on conveyor 20 along with the outer edge portions of the calendered sheet that are continuously running across rolls 15, 16 and 17 to conveyor 20. At this stage, the edge portions of the calendered sheet and the center ribbon 40 are being passed back to the feed mill where they are reworked with additional material and added to the mass of material 13 on calender rolls 11 and 12 to be recalendered into sheet form. The center cutout knife 45 is withdrawn after it removes the center ribbon 40 whereafter ribbon 40 will continue to be pulled away from calender roll 11 by the action of driven roll 46.

FIGS. 3 and 3(a) show this stage of handling the calendered material showing how the outer ribbons 39 are wound onto the carcass 10 while the center ribbon 40 now falls by gravity away from the calender roll.

The width of the outer ribbons 39 is decreased in successive increments according to the number of turns wound onto the carcass to apply the desired quantity of material which is to be formed into the tread shoulders. Once the required contour and quantity of material for the tread shoulders has been built up by an appropriate number of turns of the proper width outer ribbons 39, the application of the ribbons to the carcass 10 is terminated by a finish knife 50 being pressed against the calender roll 11. This knife severs the remaining outer ribbons 39 which is the only calendered material then being applied to the carcass. The trailing ends of these strips are wound onto the carcass and thereafter the carcass lifted out of engagement with calender roll 11. The finish knife may then be retracted and strips 39 allowed to pass around the calender roll 11 into the bite of the calender rolls to join with the mass of material 13.

To return the calendered sheet to a full continuous uninterrupted width in preparation for applying material to the next tire carcass, the inside knives 38 are withdrawn, thus no longer producing the inner slits forming ribbon 40 between ribbons 39. Immediately upon withdrawal of inside knives 38, the outside knives 28 are moved rapidly together. This severs ribbon 40, as the width of strip 31 is reduced to zero, and calendered sheet S now has only a single slit adjacent the center thereof. Then the outside knives 28 are themselves retracted, returning the calendered sheet S to a full unslit width. FIGS. 4 and 4(a) illustrate the sheet S returning to its unitary state, the inverted V-shaped opening 52 on FIG. 4 representing the cut formed by the outside knives 28 as they are rapidly moved together and thereupon retracted from slitting engagement with calender roll 11.

Figure 6:
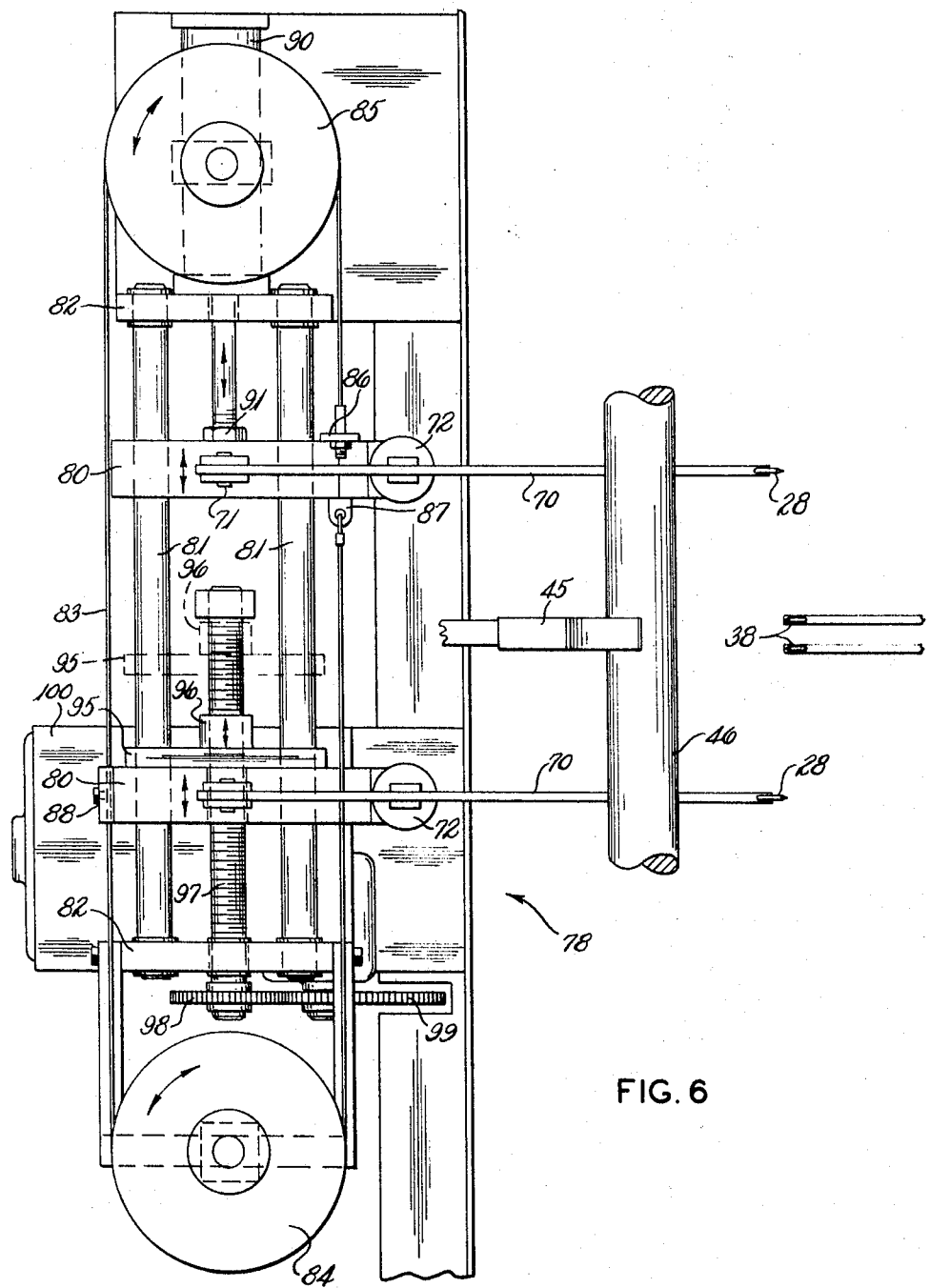
FIG. 6 is a plan view taken on line 6—6 of FIG. 5 showing certain of the operating parts for the sheet slitting knives.

FIGS. 5 and 6 illustrate without elaborate detail suitable mechanisms for carrying out the above described operations. Referring to FIG. 5, the carcass 10 is preferably mounted on an arm assembly 60, journaled at 61 to hold the carcass 10 carried by a drum which is rotatably supported on shaft 62. Shaft 62 is carried by arm assembly 60 so that the carcass will be rotated while resting on the upper side of calender roll 11 and may be raised from engagement with the calender roll 11 by a suitable pneumatic cylinder actuator (not shown) connected to arm assembly 60. The hub 63 for the drum which supports the carcass 10 has a switch actuating cam 64 adjustably mounted thereon to engage with a carcass rotation sensing control switch 65. Switch 65 is stationarily secured on the apparatus to be actuated by cam 64 for each revolution of carcass 10. The function of cam 64 and switch 65 will be described subsequently.

Each of the pairs of outside slitting knives 28 is mounted on a lever arm 70 fulcrummed at 71 and operated by a suitable air cylinder actuator 72 which is effective to raise and lower the slitting knife. Each of the inner slitting knives 38 is similarly mounted on a lever arm 75 fulcrummed at 76 and operated by a suitable air cylinder actuator 77. The mechanism 78 for moving the pair of slitting knives 28 toward each other in accordance with programmed operation of the apparatus to reduce the width of strip 31 and thereafter the widths of ribbons 39 and the mechanism 79 for moving the inner slitting knives 38 apart to reduce the width of ribbons 39 are both substantially the same. Only the construction for moving the outside knives 28 is illustrated on the drawings in FIG. 6. Description of this one mechanism should suffice for an understanding also of how the inside slitting knives are moved in accordance with programmed operation of the apparatus.

The mechanism 78 for moving outside knives 28 will now be described. Each of the arms 70 with its associated fulcrum 71 and actuator 72 is mounted on a carrier 80. These carriers are slidable along parallel guide rods 81. Rods 81 are secured in supports 82 at their opposite ends. Coordinated movement of the carriers 80 is obtained by an interconnecting cable 83 which passes around pulleys 84 and 85 mounted at opposite ends of the mechanism. The ends of cable 83 are secured to one of the carriers 80 at 86 and 87, respectively. An intermediate point in the cable 83 is secured to the other carrier at 88. By means of this cable connection, the carriers 80 are constrained to move simultaneously toward one another or away from each other depending on the direction of force applied to the carriers as explained below.

An air cylinder actuator 90 is stationarily supported with its piston rod connected at 91 to one of the carriers 80. To reposition the slitting knives 28 for each turn wound on the carcass 10, pressure is supplied to actuator 90 to move the carrier 80 to which it is attached and by reason of the connections of cable 83 to the carriers 80 both carriers move toward each other.

The extent of movement of the carriers 80 and consequently of slitting knives 28 is limited by a stop 95 which is also movable along guide rods 81. Stop 95 has an internally threaded hub 96 engaged with a lead screw 97. Screw 97 is driven through gears 98 and 99 with gear 99 connected through a speed reducer to an electric motor 100. Operation of motor 100 in the appropriate direction acts through the gears 98 and 99 to turn lead screw 97 so as to move stop 95 toward the position shown in phantom on FIG. 6. According to the required amount of reduction in width of the strip to be slit by knives 28, the stop 95 will be moved a predetermined increment by energization of motor 100 and then stopped. At this stopped point actuator 90 will have pressure applied thereto to move the carriers 80 until the one carrier engages stop 95. Of course, the other carrier 80 is prevented from further movement by reason of the above described interconnection of cable 83.

The raising and lowering of the slitting knives 28 is, of course, effected by application of pneumatic pressure to the pair of actuators 72. After each increment of movement of the carriers 80 toward one another further movement of the carriers and knives 28 carried thereby is prevented by reason of actuator 90 being blocked against further movement by preventing fluid flow to or from the actuator. This blocked state of actuator 90 holds the carriers and knives while the stop 95 is being repositioned. Such repositioning for the next turn of the carcass is effected by energization of motor 100 to move stop 95 the next predetermined amount.

As mentioned above, mechanism 79 for operating the inside knives 38 upon energization of its motor 105 is substantially identical to that described above with reference to FIG. 6 with the one difference that the operation of the mechanism 79 for the inside knives 38 is so constructed that they are moved successively apart from each other under the control action described above. This moving apart of inside knives 38 will have the effect of reducing the width of ribbons 39 while movement of outside knives 28 together will tend to reduce strip 31 and thereafter reduce the width of ribbons 39.

Programming the successive incremental movements of the slitting knives 28 and 38 may take a variety of forms and specific illustration of a control circuit to carry out such programming should not be necessary. As heretofore mentioned, the switch 65 is actuated by cam 64 for each revolution of carcass 10. It may be noted that the cam 64 curves away from a radius. This formation of the cam is preferred to more precisely signal each turn and the point at which the width of the calendered material is to be altered considering that as successive layers build up on the carcass 10, a greater length of material is needed to encircle the enlarged diameter of the carcass. Accordingly, in order to obtain stepped reductions in the widths of the applied calendered material to give a transverse line of stepped width decreases as shown on FIG. 7, the signal from switch 65 should be slightly delayed to insure a longer length of calendered material between successive decreases in the width of the material being wound.

Suitable control of the mechanism for operating the slitting knives may be obtained from the signal created by each actuation of switch 65. Each actuation represents a single revolution of the carcass and may be employed to apply pneumatic pressure to actuator 90 to press the carriers 80 toward one another. Switch 65 actuation also is employed to appropriately operate the motor 100 in mechanism 78 and motor 105 in mechanism 79 to reposition the respective stops in these mechanisms when the slitting knives 28 and 38 are to be repositioned.

As further shown on FIG. 5, the rotary knife 35 is mounted such that by a single revolution it will sever an end of the strip 31 to start the application of material to the carcass. The center cutout knife 45 is mounted on a pneumatic cylinder actuator 110 to be operated to remove the center ribbon when the shoulder portions of the tread are to be applied. The finish knife 50 is mounted on a pneumatic cylinder actuator 120 to be pressed against the calender roll 11 so that the shoulder ribbons will be severed at the completion of application of the material to the tire carcass.

In order that air may not become trapped between the carcass and the calendered strip wound thereon or between adjacent turns of the calendered material, the calendered sheet S may be vented by producing small perforations distributed over the area of the sheet. Such venting perforations may be conveniently produced by providing a perforating roller 125 adjacent the calender roll 11 where pins on the roller 125 will puncture the calendered sheet S immediately after it is calendered.

It is to be understood that the form of the invention herewith shown and described is to be taken as a preferred example of the same and that various changes in size, shape and arrangement of parts, etc. may be resorted to without departing from the spirit of the invention or the scope of the appended claims.

We claim:

1. Apparatus for building up a desired contour of rubber tread material on a tire carcass comprising, in combination:
   roll means comprising a first and second roll to supply sheet tread material,
   means to support a tire carcass in rotating contact with the first roll of said roll means,
   cutting means in contact with the first roll to separate the sheet material into a plurality of ribbons,
   positioning means to vary the spacing of said cutting means and thereby change the width of the ribbons,
   means to remove at least one ribbon from the first roll ahead of the contact of the first roll with the tire carcass.

2. Apparatus as in claim 1, wherein the roll means comprises two calender rolls and the cutting means comprises a plurality of knives placed at the surface of the first calender roll.

3. Apparatus for the continuous application of unvulcanized tread material to a tire carcass, comprising
   a calender comprising at least a first roll for forming a sheet of tread material,
   support means for rotatably holding a carcass in direct contact with said first roll of said calender,
   knife means at said first roll to form said sheet into a plurality of ribbons,
   conveyor means to remove some of said plurality of ribbons from said first roll,
   means to move said knife means to reduce the width of the remainder of said plurality of ribbons being wound upon the carcass, and
   means to sever the remainder of said plurality of ribbons.

4. Apparatus for continuous application of unvulcanized tread material to a tire carcass, comprising
   a calender comprising at least a first roll for forming a sheet of tread material,
   support means for rotatably holding a tire carcass in direct contact with said first roll,
   first knife means at said first roll to separate the sheet of material into three ribbons,
   first conveyor means to remove the outer two ribbons from said first roll,
   second knife means to separate the center ribbon into three strips,
   second conveyor means to remove the center strip from said first roll,
   positioning means to move said first and second knife means so as to vary the widths of the ribbons and the strips, and cut-off means to sever the strips.

References Cited
UNITED STATES PATENTS

| | | | |
|---|---|---|---|
| 1,312,491 | 8/1919 | McClenathen | 156—112 |
| 1,364,386 | 1/1921 | Kuentzel | 156—404 |
| 1,424,134 | 7/1922 | Litchfield | 156—112 |
| 1,522,641 | 1/1925 | McClenathen | 156—404 |
| 1,548,156 | 8/1925 | Mixsell | 156—404 |
| 1,636,595 | 7/1927 | Dumbleton | 156—112 |
| 3,223,573 | 12/1965 | Deist | 156—405X |

FOREIGN PATENTS

| | | | |
|---|---|---|---|
| 642,359 | 8/1928 | France | 156—404 |

BENJAMIN A. BORCHELT, Primary Examiner

S. C. BENTLEY, Assistant Examiner

U.S. Cl. X.R.

156—405

UNITED STATES PATENT OFFICE
CERTIFICATE OF CORRECTION

Patent No. 3,580,781                Dated June 7, 1971

Inventor(s) Jack Lyndon Hollis and Ray Douglas Shockey

It is certified that error appears in the above-identified patent and that said Letters Patent are hereby corrected as shown below:

Column 4, Line 45 "convyor" should be -conveyor-

Column 8 Line 34--delete entire line

Signed and sealed this 31st day of August 1971.

(SEAL)
Attest:

EDWARD M. FLETCHER, JR.
Attesting Officer

WILLIAM E. SCHUYLER, JR.
Commissioner of Patents